United States Patent [19]
Bertin et al.

[11] Patent Number: 6,097,241
[45] Date of Patent: Aug. 1, 2000

[54] ASIC LOW POWER ACTIVITY DETECTOR TO CHANGE THRESHOLD VOLTAGE

[75] Inventors: Claude L. Bertin, South Burlington; Alvar A. Dean; Kenneth J. Goodnow, both of Essex Junction; Wilbur D. Pricer, Charlotte; William R. Tonti, Essex Junction, all of Vt.

[73] Assignee: International Business Machines Corporation, Armonk, N.Y.

[21] Appl. No.: 09/159,898

[22] Filed: Sep. 24, 1998

Related U.S. Application Data

[63] Continuation-in-part of application No. 09/120,211, Jul. 21, 1998, Pat. No. 6,011,383.
[51] Int. Cl.[7] .................................................. H03K 3/01
[52] U.S. Cl. ........................ 327/534; 327/535; 326/31; 326/33
[58] Field of Search .................... 327/534, 535, 327/537, 544, 546, 174, 175, 18, 20, 25; 326/31, 33

[56] References Cited

U.S. PATENT DOCUMENTS

| | | | |
|---|---|---|---|
| 5,486,774 | 1/1996 | Douseki et al. | 326/33 |
| 5,589,783 | 12/1996 | McClure | 326/71 |
| 5,610,533 | 3/1997 | Arimoto et al. | 326/33 |
| 5,630,142 | 5/1997 | Crump et al. | 395/750 |

Primary Examiner—Timothy P. Callahan
Assistant Examiner—An T. Luu
Attorney, Agent, or Firm—Schmeiser, Olsen & Watts; Eugene I. Shkurko

[57] ABSTRACT

An integrated circuit such as an ASIC device having partitioned functional units with independent threshold voltage control. A first partition is always operated in a normal mode, while subsequent partitions are maintained in a standby mode until a transition is detected at the input of the first partition. The subsequent partitions are switched to the normal mode by lowering the body voltage applied to the devices with each partition. A pulse stretcher is used to keep a partition in a normal mode for a predetermined period of time after the transition is detected.

16 Claims, 2 Drawing Sheets

ASIC LOW POWER ACTIVITY DETECTOR TO CHANGE THRESHOLD VOLTAGE

RELATED APPLICATIONS

This case is a continuation-in-part of (1) Dkt. No. BU9-97-220, entitled "LOW POWERING APPARATUS FOR AUTOMATIC REDUCTION OF POWER IN ACTIVE AND STANDBY MODES," Dean et al., filed on Jul. 21, 1998, Ser. No. 09/120,211, now U.S. Pat. No. 6,011,383 and is related to (2) Dkt. No. BU9-97-220W, entitled "DEVICE AND METHOD TO REDUCE POWER CONSUMPTION IN INTEGRATED SEMICONDUCTOR DEVICES USING A LOWER POWER GROGGY MODE," Bertin et al., filed on Sep. 24, 1998, Ser. No. 09/159,861. Both related applications are assigned to the assignee of record are filed concurrently herewith.

BACKGROUND OF THE INVENTION

1. Field of the Invention

This invention relates to power management for integrated circuits, and more particularly relates to application specific integrated circuit (hereinafter "ASIC") devices requiring low standby power consumption.

2. Background of the Invention

Many applications utilize ASIC devices that are battery powered and therefore require low standby power consumption. In such applications, it is desired to have the ASIC device be capable of running at its highest speed only during periods when the device's functionality is required.

One method of controlling the power consumption of an integrated circuit (IC) is to adjust the body voltage (i.e., the voltage magnitude between body and source) applied to the transistors on the IC. Specifically, by increasing the body to source voltage, transistors will have a higher threshold voltage, consume less power, and provide lower performance. Accordingly, increased body to source voltage is suitable for integrated circuits in standby mode when low power consumption is desired over high performance. Alternatively, by lowering the body to source voltage, transistors will consume more power, have a lower threshold voltage and provide higher performance. Accordingly, decreased body voltage is suitable for integrated circuits during a normal operating mode, when the transistors are active.

Unfortunately, no known system has provided a mechanism that can take full advantage of this ability to switch devices between high and low power consumption. In particular, known systems fail to provide a good solution to determine which devices on the ASIC to switch between power consuming states, and when the devices should be switched.

SUMMARY OF THE INVENTION

The present invention seeks to provide an ASIC system that includes transistors that can operate at different power levels based upon ASIC input activities. The ASIC is first designed with discrete functional blocks or partitions, with the body voltage of each being independently controllable. Accordingly, each of the partitions is provided with a varying stage of readiness determined by the body voltage applied thereto.

The system includes a first partition coupled to an input line wherein the first partition includes transistors that always operate at a relatively low threshold voltage (i.e., high power consumption and therefore full readiness); a second partition coupled to an output of the first partition, wherein the second partition includes transistors that can selectively operate with either a low or high threshold voltage; and a threshold voltage control mechanism that switches the threshold voltage of the transistors in the second partition from high to low (i.e., low to high power consumption) when a signal is detected on the input line.

The system further includes a pulse stretcher coupled to an input of the threshold voltage control mechanism that causes the threshold voltage control mechanism to maintain the threshold voltage in the second partition as low (i.e., in a normal mode) for a predetermined amount of time after the detection of the signal. This system for switching between low and high threshold voltages can thus be implemented asynchronously, and therefore not require any clock signals to control the switching process. After the predetermined amount of time has elapsed, the pulse stretcher will cause the threshold voltage control mechanism to switch the threshold voltage in the second partition to high, thereby placing it back in a low power standby mode. Subsequent partitions may be added after the second partition and operated in a similar manner.

It is therefore an advantage of the present invention to provide an ASIC device in which power consumption is reduced.

It is therefore a further advantage of the present invention to provide an asynchronous mechanism for lowering the power consumption of functional partitions within an ASIC device.

It is therefore a further advantage of the present invention to provide an ASIC device in which the threshold voltage of various functional partitions can be modified.

It is therefore a further advantage of the present invention to provide a pulse stretcher that reacts to transitions occurring on an input line, and causes the threshold voltage of at least one partition to be lowered for a predetermined amount of time.

It is therefore a further advantage of the present invention to implement the power saving fist features described herein on an ASIC device with either SOI (silicon on insulator) technology or side multiple wells in bulk CMOS (complimentary metal oxide semiconductor) technology.

The foregoing and other objects, features, aspects, and advantages of the present invention may be more fully appreciated by considering the following detailed description and claims.

DETAILED DESCRIPTION OF THE INVENTION

The ASIC device according to this invention comprises numerous partitioned functional units (hereinafter "partitions") that operate independently of each other and wherein each partition provides some unique function required by the ASIC device. Moreover, the partitions are arranged such that the path of signals as they propagate through the partitions of the ASIC device will be known. A typical scenario will involve signals that will enter the ASIC device into a first partition, exit the first partition and enter a second partition, exit the second partition and enter a third partition, etc. Thus, signals will enter the ASIC, sequentially progress through a predetermined series of partitions, and then exit the ASIC. In addition, each partition is fabricated such that the body voltage for all of the devices within the partition can be controlled by a common source. In this manner, as required, a partition can be set to operate in a "normal mode" having a relatively low body-to-source and threshold voltage or be set to operate in a "standby mode" having a relatively high body-to-source and threshold voltage.

Figure 1:
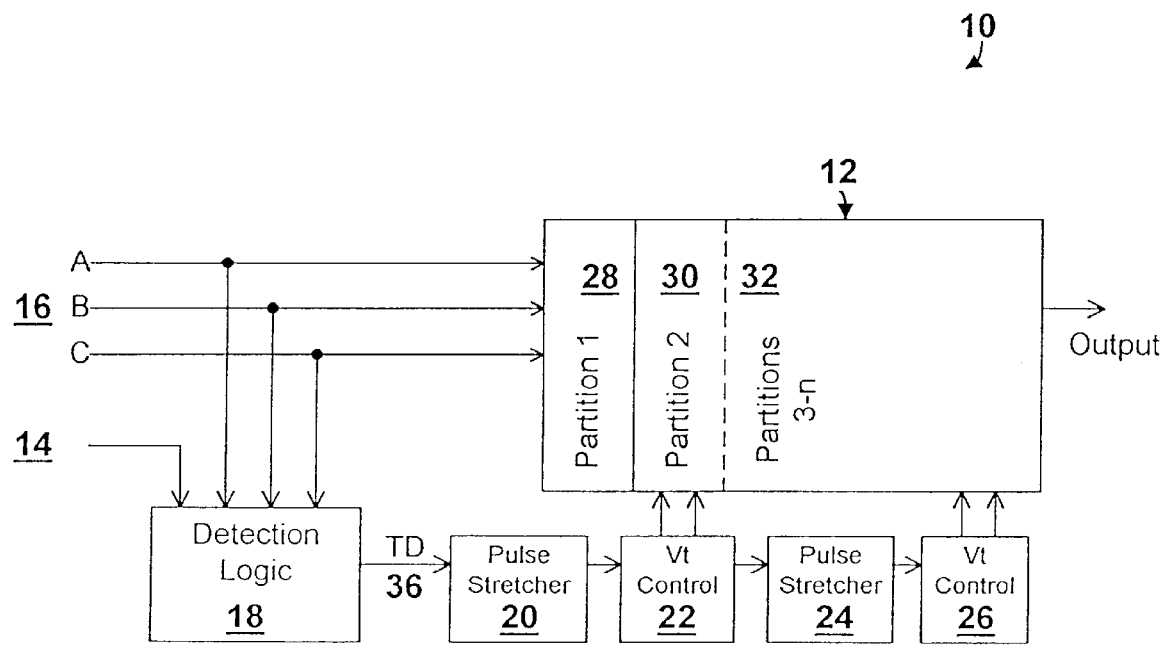
FIG. 1 depicts a block diagram of a system for controlling the threshold voltage of functional partitions on an ASIC chip in accordance with a preferred embodiment of the present invention.

Referring now to the drawings, FIG. 1 depicts an ASIC device 10 that includes a sequential series 12 of partitions. The series 12 comprises a plurality of n partitions that includes a first partition 28 and a second partition 30. Furthermore, any number 3 to n of additional partitions 32 may be included. The first partition 28 receives its input from logic inputs 16, and then outputs data to the second partition 30. The second partition 30 receives the data from the first partition and outputs its data to any subsequent partitions 32. Each partition in the set of partitions 32 behaves in a similar manner, receiving input from a previous partition and outputting data to a subsequent partition.

Only the first partition 28 is continuously powered for normal, high performance operations (i.e., relatively low body-to-source and threshold voltage). The subsequent partitions 30, 32 operate in a normal mode only when signals are detected at the logic inputs 16. Accordingly, during periods when no signals are detected at logic inputs 16, the subsequent partitions 30, 32 will operate in a standby mode with a relatively high body-to-source voltage to reduce power consumption. When signals are detected at logic inputs, the subsequent partitions will be switched to the normal mode having a relatively low body-to-source voltage to allow for high performance. Thus, the first partition 28 will always be operational in a high power, high performance, low threshold voltage mode. Alternatively, subsequent partitions 30, 32 will be held in a low power standby mode until an input signal is detected, at which time the partitions will be switched to a normal, high performance mode.

The mechanisms for switching partitions between standby and normal modes include transition detection logic 18, pulse stretcher 20, and threshold voltage control mechanism 22. The device may be implemented as a two-stage system such that all subsequent partitions 30, 32 are grouped together and switched in unison. Alternatively, the device 10 may be implemented as a multistage system and include an additional pulse stretcher 24 and voltage control mechanism 26 for each additional partition (3–n). Since each partition is independently switchable, the partitions can be sequentially switched to and from normal mode and standby mode. The system depicted in FIG. 1 can also be reconfigured with the input of pulse stretcher 24 connected to the output of detector logic 18 and in common with the input of pulse stretcher 20.

During operations, the ASIC device 10 works as follows. The first partition 28 is maintained in a normal, high performance, high powered mode, while all subsequent partitions 2–n are maintained in a standby, low power mode. When a signal is sent to the ASIC device via logic inputs 16, the transition detection logic 18 detects the transition and outputs a detection signal (TD) 36 to the pulse stretcher 20 that indicates that the second partition 30 should be switched to normal mode. Alternatively, transition detection logic 18 may output a detection signal (TD) 36 when a data valid signal on data valid line 14 is detected. The data valid signal could originate from a variety of sources, such as a keyboard, a software application, etc. The pulse stretcher 20 in turn causes voltage control mechanism 22 to lower the body-to-source voltage of the devices in the second partition 30 to the necessary level. Because the signals have to first propagate through the first partition 28, the device 10 has enough time to switch the second partition 30, and any further partitions 3–n, out of standby mode.

In addition to switching between modes, the pulse stretcher 20 causes the voltage control mechanism 22 to keep the subsequent partitions 30, 32 in the normal mode for a predetermined amount of time. In general, after some activity is detected, it is preferred to keep a partition switched to a normal mode for some period of time because: (1) once some activity is detected, more activity will typically follow, and (2) switching between modes expends energy, so any unnecessary switching should be avoided. Thus, partitions are not being switched between modes each time that a transition is detected or not detected on logic input 16. Rather, the system presumes that more activity will follow and therefore, given the effort needed to switch the partition, the partition remains at maximum performance for some predetermined amount of time.

As noted, additional pulse stretchers 24 and voltage control mechanisms 26 may be included for each additional partition 32 (i.e., for partitions 3–n). The additional pulse stretchers and voltage control mechanisms allow subsequent partitions 3–n to likewise be turned on in a sequential manner as data propagates through the ASIC device. Accordingly, the second partition 30 may be switched to normal mode while the first partition is processing data from input 16, then the third partition may be switched while the second partition 30 is processing the data received from the first partition 28, etc. Each subsequent partition 30, 32 may be switched back to standby mode in a similar manner, namely, first the second partition will return to standby mode, then the third partition will return to standby mode, etc. However, it should be understood that any desired method of turning on and off subsequent partitions fall within the scope of this invention.

Figure 2:
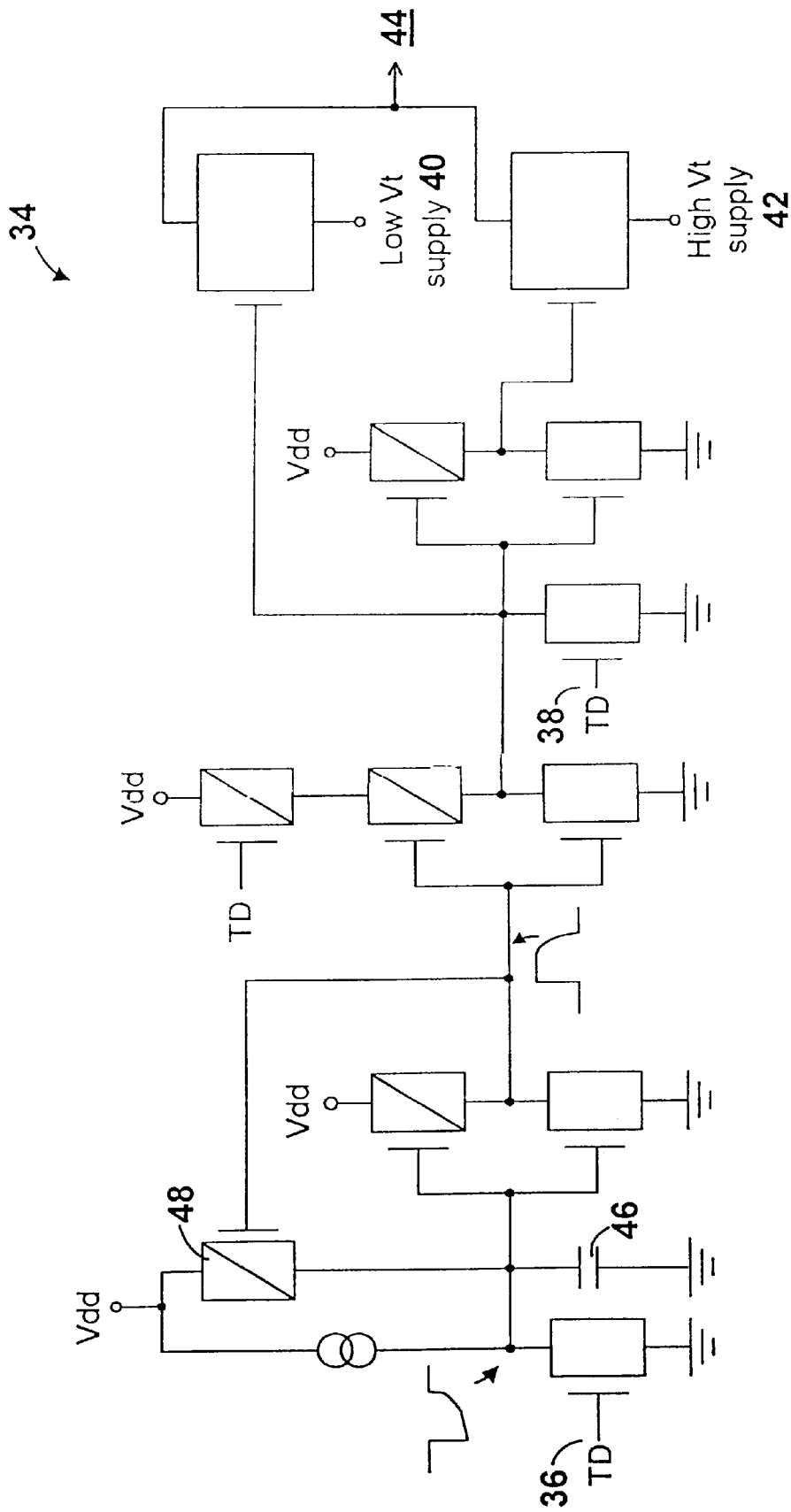
FIG. 2 depicts a circuit diagram of a pulse stretch circuit in accordance with a preferred embodiment of the present invention.

Referring now to FIG. 2, a circuit 34 of a pulse stretcher and threshold voltage control mechanism in accordance with FIG. 1 is depicted in detail. The circuit 34 receives a signal TD on input line 36 from the transition detection logic 18 of FIG. 1 when a transition is detected. The circuit 34 utilizes capacitor 46, along with transistor 48, to essentially stretch out the signal TD received at input 36. The pulse is stretched in order to allow a partition to remain in a high power state for some residual period after a transition was detected. The system includes both a low threshold voltage power supply 40 and a high voltage threshold power supply 42. During the periods where no transitions are detected, the high threshold voltage power supply 42 powers the associated partition's body voltage high such that the associated partition remains in a standby mode. Conversely, when a transition has been detected and a pulse is generated, the low threshold voltage power supply 40 powers the associated partition's body voltage low such that the associated partition will operate in a normal, high performance mode. As is evident from the circuit depicted in FIG. 2, no clock signal is required to control the switching between high and low threshold voltages.

The circuit also includes a rapid recovery feature triggered by input 38 that causes the output 44 to quickly switch to the normal, high performance mode (i.e., use the low threshold voltage supply 40) during times when the system is in the process of switching back to standby mode. When input 38 receives signal TD the low threshold voltage supply 40 is quickly turned back on. This additional novelty eliminates the need to wait until the circuit switches completely back to standby mode before the system can be again switched to normal mode.

Figure 3:
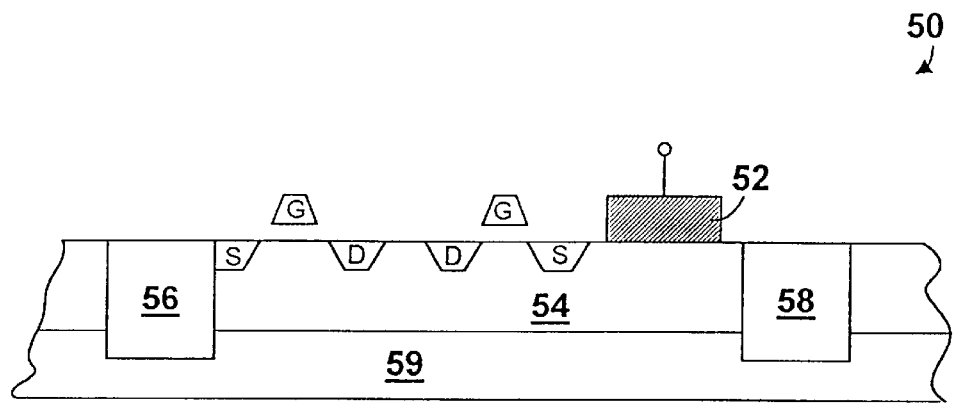
FIG. 3 depicts a cross-sectional view of a silicon oxide isolated transistor in accordance with a preferred embodiment of the present invention.

Referring now to FIG. 3, a cross section of a silicon on insulator (SOI) device 50 is depicted. The device 50 is isolated between insulators 56 and 58 and insulation layer 59. The isolated region 54 contains a plurality of transistors that form a unique partition. The unique partition is controlled by body contact 52. By varying the body voltage applied at contact 52, the operational characteristics of the transistor are altered. In particular, by decreasing the voltage magnitude between body and source, the threshold voltage is reduced and the transistors in the partition are switched to a normal mode. By increasing the voltage magnitude between body and source, the threshold voltage is increased and the transistors in the partition are switched to a standby mode.

In addition to implementing the ASIC system in SOI, it is understood that the partitioned system could be implemented using complementary metal oxide semiconductor (CMOS) devices in bulk technologies formed within multiple wells. An example of such an implementation is described in pending U.S. patent application Ser. No. 08/866,674, filed on May 30, 1997, entitled "Method of Forming Self-Aligned Halo-Isolated Wells," and assigned to International Business Machines Corporation, and hereby incorporated by reference. The aforementioned disclosure describes a method for forming self-aligned double well structures, which could be used to implement this invention in bulk CMOS. Traditionally, CMOS technology has not been used for partitioned applications because of the difficulties involved in isolating transistors that share a common substrate voltage. However, utilizing the solution provided in the aforementioned disclosure, a novel implementation is provided.

The foregoing descriptions of the preferred embodiment in the invention have been presented for purposes of illustration and description. They are not intended to be exhaustive or to limit the invention to the precise form disclosed, and obviously many modifications and variations are possible in light of the above teachings. Such modifications and variations that may be apparent to a person skilled in the art are intended to be included within the scope of this invention as defined by the accompanying claims.

We claim:

1. A clockless method for controlling a partitioned circuit, the clockless method comprising the steps of:
    monitoring input lines for transitions of incoming signals thereon;
    a first active partition of the circuit immediately processing received ones of the incoming signals; and
    turning on a second partition of the circuit in response to transitions of the incoming signals on the input lines, including decreasing a voltage magnitude between body and source of devices only in the second partition.

2. The method of claim 1 further comprising the step of turning on a successive non-active partition after turning on the second partition.

3. The method of claim 1 further comprising the step of turning off the second partition, after the step of turning on the second partition, in response to detecting a lapse of the transitions of the incoming signals for a preselected period of time.

4. A method of controlling a partitioned circuit comprising the steps of:
    monitoring input lines for transitions of incoming signals to a first partition; and
    turning off a second partition of the circuit in response to detecting a lapse of the transitions of the incoming signals for a preselected period of time, the step of turning off the second partition includes increasing a voltage magnitude between body and source of devices not in a first partition to a predetermined level.

5. The method of claim 4 further comprising the step of turning the second partition of the circuit back on if transitions on the input lines are detected after the voltage magnitude between body and source of the devices not in the first partition has been increased to the predetermined level.

6. The method of claim 5 further comprising the step of quickly turning the second partition of the circuit back on if transitions on the input lines are detected and the voltage magnitude between body and source of the devices not in the first partition was in a process of returning to the predetermined level.

7. A system for controlling a partitioned circuit, comprising:
    a first partition coupled to at least one input line, wherein the first partition includes a plurality of transistors that always operate with a predetermined threshold voltage;
    a second partition coupled to an output of the first partition, wherein the second partition includes a plurality of transistors that can selectively operate with either a low or high threshold voltage; and
    a threshold voltage control mechanism that switches the threshold voltage of the transistors in the second partition from high to low when an input signal is detected on the at least one input line.

8. The system of claim 7 further comprising a pulse stretcher coupled to an input of the threshold voltage control mechanism, wherein the pulse stretcher causes the threshold voltage control mechanism to maintain the threshold voltage in the second partition low for a predetermined amount of time after the detection of the signal.

9. The system of claim 8, wherein the pulse stretcher causes the threshold voltage control mechanism to switch the threshold voltage in the second partition to high after the predetermined amount of time has elapsed.

10. The system of claim 9, wherein the pulse stretcher includes a quick recovery circuit, wherein the quick recovery circuit causes the threshold voltage in the second partition to be switched quickly to low during a time when both a new signal is detected at the input of the pulse stretcher and the threshold voltage is in the process of being switched to high.

11. The system of claim 7 further comprising a transition detection logic coupled to the at least one input line, wherein the transition detection logic outputs a detection signal when a transition is detected on the at least one input line.

12. The system of claim 7 further comprising detection logic coupled to a data valid input, wherein the detection logic outputs a detection signal when a data valid signal is detected on the data valid input.

13. The system of claim 8, wherein the pulse stretcher operates without a clock signal.

14. The system of claim 7, wherein each of the first and second partitions are formed in unique regions on a silicon on insulator (SOI) device.

15. The system of claim 7, wherein each of the first and second partitions are formed in unique wells within a complimentary metal oxide silicon (CMOS) bulk device.

16. The system of claim 7, further comprising:
a third partition coupled to an output of the second partition, wherein the third partition also includes a plurality of transistors that can selectively operate with either a low or high threshold voltage; and
a second threshold voltage control mechanism that switches the threshold voltage of the transistors in the third partition from high to low when an input signal is detected on the at least one input line after the threshold voltages of the transistors in the second partition have been switched from high to low.

* * * * *